United States Patent [19]
Mizusawa

[11] 3,894,706
[45] July 15, 1975

[54] TUBING CLAMP ASSEMBLY FOR MAINTAINING TUBES IN LOCKED PARALLEL RELATIONSHIP TO SURFACE

[75] Inventor: Akira Mizusawa, Amagasaki, Japan

[73] Assignee: Illinois Tool Works Inc., Chicago, Ill.

[22] Filed: Nov. 15, 1972

[21] Appl. No.: 306,969

[30] Foreign Application Priority Data
Apr. 22, 1972   Japan.......................... 4747919

[52] U.S. Cl............. 248/68 CB; 24/81 CC; 248/73; 248/74 A
[51] Int. Cl.² ........................................... F16L 3/10
[58] Field of Search............ 248/68 R, 68 CB, 74 R, 248/74 A, 73, 71, 223-225; 24/81 CC, 73 CC, 73 SA, 73 RP, 81 TH, 255 C; 52/717, 718; 174/97, 70 C

[56] References Cited
UNITED STATES PATENTS

| | | | |
|---|---|---|---|
| 2,396,925 | 3/1946 | Morehouse | 248/68 R |
| 2,483,813 | 10/1949 | Davis | 248/225 X |
| 2,904,864 | 9/1959 | Jansson | 52/718 X |
| 2,913,210 | 11/1959 | Tichnor | 248/223 |
| 3,324,853 | 6/1967 | Czorny et al. | 248/74 A X |
| 3,387,343 | 6/1968 | Fitz-Gerald | 248/68 CB X |
| 3,421,187 | 1/1969 | Ryder | 248/74 PB X |
| 3,540,687 | 11/1970 | Cuva | 248/225 X |
| 3,596,861 | 8/1971 | Baldini | 248/224 |

FOREIGN PATENTS OR APPLICATIONS

| | | | |
|---|---|---|---|
| 1,811,425 | 6/1970 | Germany | 248/68 R |
| 465,687 | 1/1969 | Switzerland | 248/68 R |
| 1,147,914 | 4/1969 | United Kingdom | 24/73 AP |
| 1,559,036 | 3/1969 | France | 24/255 C |
| 1,028,026 | 5/1966 | United Kingdom | 248/68 R |
| 1,021,496 | 3/1966 | United Kingdom | 248/74 A |

*Primary Examiner*—Roy D. Frazier
*Assistant Examiner*—Rodney H. Bonck
*Attorney, Agent, or Firm*—Robert W. Beart; J. R. Halvorsen

[57] ABSTRACT

An assembly for fixing elongated bodies such as tubes to a support with a plurality of gripper means extending upwardly from a base plate and adapted to cooperate with a cover plate having means to engage the gripper means and means to fit within the interspaces of the grippers to insure continued engagement with the tubes by the grippers.

2 Claims, 4 Drawing Figures

TUBING CLAMP ASSEMBLY FOR MAINTAINING TUBES IN LOCKED PARALLEL RELATIONSHIP TO SURFACE

This invention relates generally to a clamp assembly, and more particularly to a clamp assembly for fixing elongated bodies such as tubes or pipes to a wall of a housing of a machine or apparatus.

The object of this invention is to provide a clamp assembly of the above mentioned type which is easy to handle and assures that tubes are positively held against external force.

To attain this object, the clamp assembly according to this invention essentially comprises a one-piece base member having at least two U-shaped grippers and a one-piece cover member having one front plate, two catch extensions integrally connected to the ends of said front plate and leg extensions in a number equal to the number of interspaces defined by adjacent grippers, said leg extensions being integrally connected to said front plate, and being adapted to snap into said interspaces between said grippers.

Other advantages and objects will be more apparent from the following description when considered in connection with the attached drawings in which.

Figure 1:
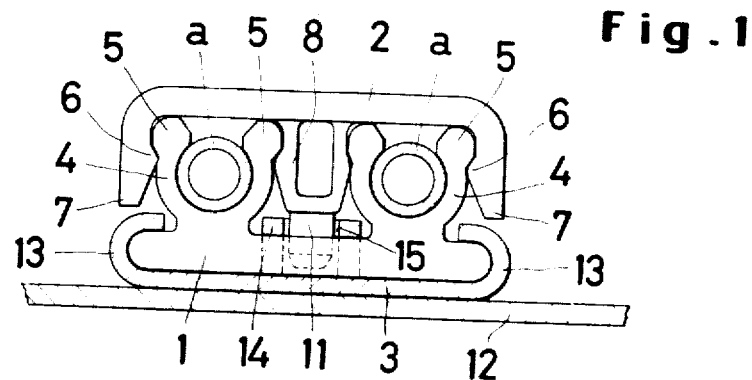
FIG. 1 is a side view of a clamp assembly according to this invention, partly in section showing the manner in which tubes are positively held.
Figure 2:
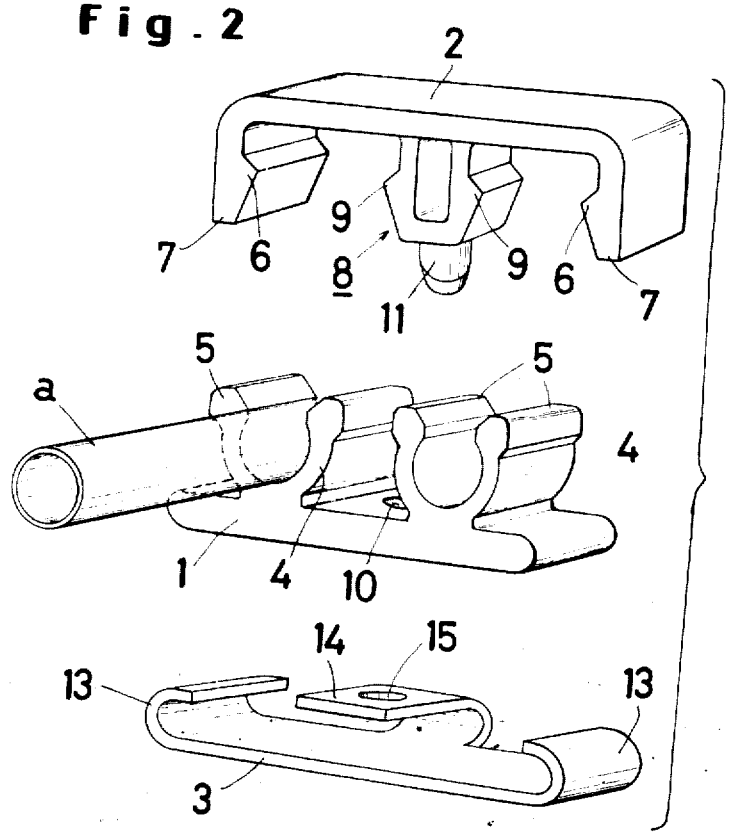
FIG. 2 is an exploded view of the clamp assembly as shown in FIG. 1.

Referring particularly to FIGS. 1 and 2, the reference numeral 1 indicates a base member for holding elongated bodies a, the reference numeral 2 indicates a cover member which is adapted to fit on the base member 1, and the reference numeral 3 designates a metal holder member to grip the base member 1. The base member 1 comprises a mold of a flexible material such as a synthetic resin. Also, the cover member is composed of a mold of a synthetic resin.

Two U-shaped grippers 4 for holding tube or pipe bodies a are spaced from each other in parallel, and provided on the upper surface of the base member 1. Either open end of each U-shaped gripper has an outer raised portion 5.

The cover member 2 is a mold in the form of the letter E. More specifically, in this embodiment the cover member 2 comprises a front plate having catch extensions 7 integrally connected to the ends of the front plate at right angles, and a leg extension 8 integrally connected to the center of the lower surface of the front plate. Each catch extension 7 has a pawl 6 which is adapted to engage the raised portion of the associated end of the U-shaped gripper. The leg extension 8 is adapted to snap into the interspace between the U-shaped grippers 4 on the base member 1.

The width of the leg extension is somewhat larger than the interspace between the U-shaped grippers. The leg extension has an elongated hollow portion therein and an outer raised pawl portion 9 at either side. In this particular embodiment the leg extension has a male projection 11 integrally connected to the end of the leg extension, whereas a female aperture 10 is made on the base member at the middle of the interspace between the U-shaped grippers 4. Thus, the male projection of the leg extension when inserted into the interspace, will fit in the female aperture 10 of the base member 1.

In fixing the assembly to a housing wall of a machine, first the metal holder 3 is welded to a metal housing wall 12, and then the metal holder thus fixed is used to hold the base member 1. As shown in the drawings, the metal holder has upward bent, curved portions 13 at opposite ends to grip the ends of the base member. A similar bent portion 14 is provided at the middle of one of the longitudinal opposite sides of the metal holder. The middle bent portion 14 is adapted to accommodate the middle portion of the base member when the base member is nested in the metal holder. The middle bent portion has an aperture 15, which is put in registration with the female aperture 10 of the base member 1 when the base member is nested in the metal holder.

The metal holder 3 is welded to a metal wall of a machine housing at an appropriate position. The base member is nested in the metal holder by allowing the curved end portions 13 and the middle bent portion 14 to hold the opposite rounded ends and the middle portion of the base member respectively.

After mounting the base member 1 in the metal holder 3, tube bodies a are fitted in the grippers 4, and then the cover member 2 is put on, allowing the pawls 6 of the catch extensions to engage the associated outer raised portions 5 of the grippers 4 and at the same time allowing the pawls 9 of the leg extension 8 to engage the associated inner raised portions 5 of the grippers 4. When the leg extension abuts against the inner raised portions of the grippers in the course of insertion, the leg portion collapses because of the hollow-portion provided therein and finally it snaps into the interspace between the grippers. At the same time the male projection of the leg extension fits in the aperture of the middle bent portion and the female aperture of the base member.

Thus in the mating position, the pawls 6 of the catch extensions 7 of the cover member 2 engage the outer raised portions 5 of the U-shaped grippers, whereas the outer raised portions 9 of the leg extension 8 engage the inner raised portions 5 of the grippers, thus positively preventing the leg extension from slipping out of the interspace between the grippers. In forcibly inserting the leg extension into the interspace between the grippers, the leg extension collapses because of the hollow-portion provided therein, and after the leg portion fits in the interspace, the leg extension recovers because of the resiliency of the material. At the same time this recovery applies the force to push the inner branch of each gripper against the associated tube thus positively holding the tubes a. In this particular embodiment the male projection 11 is inserted in the aperture 15 of the middle bent portion 14 and the female aperture 10 of the base member 1, thus preventing the crosswise displacement of the cover member, and at the same time preventing the base member 1 from slipping out of the metal holder 3.

As is apparent from the above, the embodiment not only is easy to handle but also assures the positive holding of tubes even if the pawls of the catch extensions should slip off the outer raised portions of the grippers as a result of accidental external impact because the leg extension inserted into the interspace continuously applies resilient force to push the branches of the U-shaped grippers against the tubes in the grippers.

Figure 3:
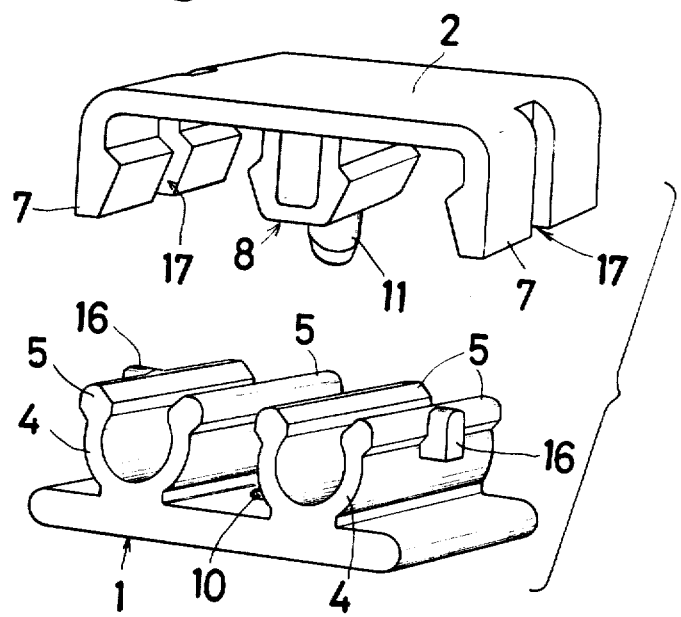
FIG. 3 is a exploded view of another embodiment of this invention.

Referring to FIG. 3, another embodiment is shown wherein a slot 17 is provided at the middle portion of each catch extension and an ear projection 16 is provided on the outside branch of the U-shaped gripper 4 at each end. When the cover member 2 fits over the base member 1, the ear projections 16 are in the slots 17. Thus, even if the male projection 11 should slip out of the female aperture 10 of the base member 1 as a result of being twisted, the cover member will not be detached in the cross direction because the ear projection 16 still remain in the slots, catching the cover member.

Figure 4:
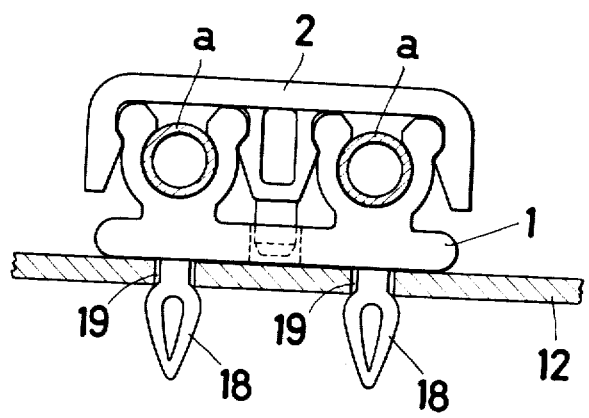
FIG. 4 is an side view of another embodiment of the clamp assembly according to this invention.

FIG. 4 shows another means for attaching the clamp assembly according to this invention to a housing wall of a machine etc. The clamp assembly is provided with two anchor pieces 18 on the under surface of the base member. The anchor pieces are adapted to fit in the apertures which are made in the wall 12 of a housing of a machine or the like.

Although particular embodiments are described herein above, it is apparent to those skilled in the art that these embodiments can be modified without departing from the spirit of this invention.

The embodiments herein disclosed are designed to hold two tubes, but as a matter of course they may be modified to hold more than two tubes as many as required.

What is claimed is:

1. A clamp assembly for fixing elongated bodies such as tubes to a wall comprising a base member, a cover member to fit said base member and a metal plate for fixing said base member to said wall having two curved bent portions on opposite ends and at least one bent portion along one longitudinal edge, said bent portions providing space to accomodate said base member, said base member including a plate having at least two U-shaped grippers extending upwardly from one side thereof, each of said U-shaped grippers having raised portions provided on the free ends thereof, said cover member comprising a plate co-extensive with said base member and including coupling means, said coupling means including two catch extensions having pawls to engage the associated raised portions of said grippers and resilient leg extensions equal in number to the number of interspaces defined by adjacent grippers, said leg extensions being adapted to fit in said interspaces and to cooperate with said gripper to insure engagement between the gripper and said tube carried therein, said catch and leg extensions being integrally connected to said cover plate, means for preventing transverse movement between said cover member and said plate.

2. A clamp assembly according to claim 1 wherein said at least one bent portion along one longitudinal edge has at least one aperture for receiving a leg extension therein.

* * * * *